(12) United States Patent
Nassar et al.

(10) Patent No.: US 12,552,227 B2
(45) Date of Patent: Feb. 17, 2026

(54) CONTROLLING A HVAC SYSTEM OF A VEHICLE

(71) Applicant: JAGUAR LAND ROVER LIMITED, Warwickshire (GB)

(72) Inventors: Waad Nassar, Coventry (GB); Irina Dejanu, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 203 days.

(21) Appl. No.: 18/553,227

(22) PCT Filed: Mar. 31, 2022

(86) PCT No.: PCT/EP2022/058700
§ 371 (c)(1),
(2) Date: Sep. 29, 2023

(87) PCT Pub. No.: WO2022/207870
PCT Pub. Date: Oct. 6, 2022

(65) Prior Publication Data
US 2024/0208296 A1    Jun. 27, 2024

(30) Foreign Application Priority Data
Mar. 31, 2021   (GB) .................................... 2104574

(51) Int. Cl.
*B60H 1/00* (2006.01)
(52) U.S. Cl.
CPC ......... *B60H 1/008* (2013.01); *B60H 1/00778* (2013.01); *B60H 1/00828* (2013.01)
(58) Field of Classification Search
CPC ............... B60H 1/008; B60H 1/00778; B60H 1/00828; B60H 1/00849; B60H 3/06; B60H 3/0071
See application file for complete search history.

(56) References Cited

U.S. PATENT DOCUMENTS

2012/0264361 A1    10/2012   Scheer et al.
2020/0171918 A1*   6/2020    Yeon ................... B60H 1/00785
(Continued)

FOREIGN PATENT DOCUMENTS

CN      108473025 A     8/2018
WO      2017121945 A1   7/2017

OTHER PUBLICATIONS

International Search Report and Written Opinion of the International Searching Authority for International application No. PCT/EP2022/058700 dated Aug. 2, 2022.
(Continued)

*Primary Examiner* — Marc E Norman
(74) *Attorney, Agent, or Firm* — Carlson, Gaskey & Olds, P.C.

(57) ABSTRACT

The invention provides a control system (13) for controlling a heating, ventilation and air conditioning (HVAC) system of a vehicle (10). The control system (13) receives a cleaning cycle request (22) indicating a requested time to initiate a cleaning cycle performed by the HVAC system, the cleaning cycle being for reducing a level of one or more pollutants in a cabin (12) of the vehicle (10). The control system (13) determines, at the requested time, whether certain conditions are satisfied, including a condition that the vehicle (10) is not currently undertaking a vehicle journey. The control system (13) transmits a control signal (26) to control the HVAC system to initiate the cleaning cycle if it is determined that the conditions are satisfied.

19 Claims, 3 Drawing Sheets

(56) References Cited

U.S. PATENT DOCUMENTS

2020/0180387 A1    6/2020  Sarma
2021/0221243 A1*  7/2021  Kawamoto ............ G06Q 50/06
2022/0185062 A1*  6/2022  Khaw .................. B60N 2/0021

OTHER PUBLICATIONS

Combined Search and Examination Report under Sections 17 and 18(3) for Application No. GB2104574.5 dated Sep. 24, 2021.

* cited by examiner

CONTROLLING A HVAC SYSTEM OF A VEHICLE

TECHNICAL FIELD

The present disclosure relates to controlling a heating, ventilation and air conditioning (HVAC) system of a vehicle. Aspects of the invention relate to a control system, to a method, to a vehicle, and to a non-transitory, computer-readable medium.

BACKGROUND

Heating, ventilation and air conditioning (HVAC) systems in vehicles, such as cars, can be used to control various factors in a cabin of the vehicle. For instance, the temperature in the vehicle cabin can be heated or cooled by moving air past either a heater core or air conditioning evaporator of the HVAC system before it is introduced into the cabin.

The air that is heated or cooled can be vented air, recirculated air, or a combination of both. Vented air refers to air that is drawn into the vehicle cabin from outside of (external to) the vehicle past one or more components of the HVAC system. Recirculated air refers to air in the vehicle cabin that is recirculated past one or more components of the HVAC system before returning to the vehicle cabin.

A HVAC system may also be used to improve the quality of air in the vehicle cabin. In particular, (vented and/or recirculated) air may be moved past one or more air filters of the HVAC system in order to remove one or more pollutants from the air.

There is an increased awareness about the quality of air that people are exposed to on a daily basis, and a desire for such air to be free from—or have reduced levels of—pollutants and pathogens. Although a HVAC system may be operated during a vehicle journey to prioritize cleaning of cabin air, a number of factors may limit the effectiveness of such cleaning. For instance, the driver and any other passengers present in the cabin may be contributing to contamination of the air, for example by spreading virus particles. Also, the preferences of one or more of the vehicle occupants may be in conflict with effective cabin air cleaning, for example if an occupant wishes to open a window or utilise the HVAC system to prioritize temperature control. Furthermore, it may take time for a HVAC system to effectively clean the cabin air, meaning that vehicle occupants may still be exposed to air with undesirable levels of one or more pollutants at the start of a vehicle journey.

It is against this background to which the present invention is set.

SUMMARY OF THE INVENTION

Aspects and embodiments of the invention provide a controller for controlling a vehicle HVAC system, a method of controlling the HVAC system, a vehicle including the controller, and a non-transitory, computer readable medium having instructions to perform the method, as claimed in the appended claims According to an aspect of the invention there is provided a control system for controlling a heating, ventilation and air conditioning (HVAC) system of a vehicle. The control system comprises one or more controllers. The control system is configured to receive a cleaning cycle request indicating a requested time to initiate a cleaning cycle performed by the HVAC system, the cleaning cycle being for reducing a level of one or more pollutants in a cabin of the vehicle. The control system is configured to determine, at the requested time, whether one or more conditions are satisfied, the one or more conditions including a condition that the vehicle is not currently undertaking a vehicle journey. The control system is configured to transmit a control signal to control the HVAC system to initiate the cleaning cycle if it is determined that the one or more conditions are satisfied.

The invention is advantageous in that a vehicle HVAC system can be controlled to provide a more reliable level of cleaning of the air in the vehicle cabin. The invention is also advantageous in that occupants of the vehicle cabin may be exposed to cleaner air at the start of a vehicle journey.

The one or more controllers may collectively comprise: at least one electronic processor having an electrical input for receiving the cleaning cycle request; and at least one memory device electrically coupled to the at least one electronic processor and having instructions stored therein; and wherein the at least one electronic processor is configured to access the at least one memory device and execute the instructions thereon so as to determine whether the one or more conditions are satisfied.

Determining whether the condition that the vehicle is not currently undertaking a vehicle journey is satisfied may comprise checking that one or more of the following are satisfied: an engine of the vehicle is off; the vehicle is stationary; a current power mode of the vehicle is a power off mode; and, an alarm of the vehicle is active (but not triggered, for instance).

A battery of the vehicle may be configured to power the HVAC system to perform the cleaning cycle.

Beneficially, this ensures that an engine of the vehicle does not need to be started to perform the cleaning cycle (i.e. a remote engine start function is not needed), thereby limiting vehicle emissions into the environment caused by this functionality.

The conditions may include a condition that a level of charge of the battery exceeds a charge limit level.

The control system may be configured to output a signal indicative of a requirement to schedule charging of the battery in the event that the level of charge of the battery is determined to be less than the charge limit level.

The conditions may include one or more of: one or more windows of the vehicle are closed; one or more doors of the vehicle are closed; a roof panel of the vehicle is closed; a tail gate of the vehicle is closed; a bonnet of the vehicle is closed; and, one or more doors of the vehicle are locked.

The conditions may include one or more of: a crash status of the vehicle indicates that the vehicle has not been involved in a crash; a theft status of the vehicle indicates that the vehicle has not been stolen; an alarm of the vehicle is not active; and, an emergency or breakdown call system of the vehicle is not active.

The conditions may include a condition that a number of cleaning cycles that have been initiated since a previous vehicle journey is not greater than a prescribed upper number of cleaning cycles. Optionally, the previous vehicle journey may be indicated by a previous ignition cycle of the vehicle.

The conditions may include a condition that one or more components of the HVAC system are not faulty.

The one or more components may comprise a recirculation door for adjusting the ratio of vented to recirculated air entering the vehicle cabin.

The one or more conditions may include a condition that a recirculation door for adjusting the ratio of vented to recirculated air entering the vehicle cabin can be actuated to a position that does not allow vented air to enter the vehicle cabin.

The conditions may include a condition that one or more further features of the HVAC system are not currently being performed by the HVAC system.

By ensuring that the one or more conditions are met before the control system controls the HVAC system to perform the cabin air cleaning cycle, a certain level of cleaning is more likely to be achieved.

The further features of the HVAC system may include a climate conditioning feature for controlling a temperature in the vehicle cabin in accordance with a desired temperature prior to the vehicle undertaking a vehicle journey.

When the cleaning cycle is being performed by the HVAC system, the control system may be configured to determine whether one or more stop conditions are satisfied, and the control system may be configured to transmit a control signal to control the HVAC system to stop the cleaning cycle if it is determined that at least one of the stop conditions is satisfied.

The one or more stop conditions may include that at least one of the conditions are not satisfied.

The cleaning cycle may last a predefined length of time.

The HVAC system may initiate a predefined control routine to control one or more components of the HVAC system in order to perform the cleaning cycle.

To perform the cleaning cycle the HVAC system may be configured to draw air in the vehicle cabin through at least one filter component of the vehicle to reduce the level of pollutants in the vehicle cabin. The one or more filter components may include one or more of: a particulate matter (PM) filter for removing particulate matter from the vehicle cabin (optionally wherein the PM filter is a PM2.5 filter); a carbon layer filter for removing odour, volatile organic compounds, and/or toxic gases from the vehicle cabin; an anti-allergen layer for removing one or more allergens from the vehicle cabin; and, one or more ionizers for removing one or more pathogens from the vehicle cabin.

To perform the cleaning cycle the HVAC system may be configured, during an initial period of the cleaning cycle, to operate in a fresh air mode comprising extracting cabin air and drawing in air from external to the vehicle.

To perform the cleaning cycle the HVAC system may be configured to enter a re-circulation mode in which the HVAC system does not draw air into the vehicle cabin from external to the vehicle.

The requested time may be a future time to schedule the cleaning cycle to be initiated in the future. Alternatively, the requested time may be a current time to request the cleaning cycle to be initiated immediately.

The control system may be configured to determine, upon receipt of the cleaning cycle request, whether one or more conditions are satisfied. If at least one condition is not satisfied, then the control system may be configured to transmit an error signal to notify a user.

The control system may be configured to receive the cleaning cycle request as a signal from off-board the vehicle. Optionally, the signal from off-board the vehicle may be from a user device external to the vehicle.

The control system may be configured to transmit a signal, off-board the vehicle to a user device, wherein the signal is at least one of:

a signal to inform the user that the cleaning cycle has been initiated;

a signal to inform the user that the cleaning cycle cannot be initiated in the event that it is determined that the one or more conditions are not satisfied;

a signal to inform the user that the cleaning cycle has been interrupted, optionally wherein the signal is to notify the user of the reason that the cleaning cycle has been interrupted; and a signal to inform the user that the cleaning cycle has been completed.

The control system may be configured to receive the cleaning cycle request as a user input via a human-machine interface of the vehicle.

If it is determined that at least one of the conditions is not satisfied, then the control system may be configured to transmit an error signal, off-board the vehicle to a user device, indicating that the cleaning cycle cannot be initiated or has been stopped. Optionally, the error signal may indicate which condition is not satisfied.

The control system may be configured to receive sensor signals, from one or more sensors of the vehicle, indicative of a current level of one or more pollutants in the vehicle cabin. The control system may be configured to transmit a signal, off-board the vehicle to a user device, to notify a user of the current level of the one or more pollutants.

According to another aspect of the invention there is provided a vehicle comprising a controller as defined above.

According to another aspect of the invention there is provided a method of controlling a heating, ventilation and air conditioning (HVAC) system of a vehicle. The method comprises receiving a cleaning cycle request indicating a requested time to initiate a cleaning cycle performed by the HVAC system, the cleaning cycle being for reducing a level of one or more pollutants in a cabin of the vehicle. The method comprises determining, at the requested time, whether one or more conditions are satisfied, the one or more conditions including a condition that the vehicle is not currently undertaking a vehicle journey. The method comprises transmitting a control signal to control the HVAC system to initiate the cleaning cycle if it is determined that the one or more conditions are satisfied.

According to another aspect of the invention there is provided a non-transitory, computer readable medium storing instructions thereon that, when executed by a computer processor, causes the computer processor to perform a method as defined above.

According to another aspect of the invention there is provided a computer software that, when executed, is arranged to perform a method as defined above.

Within the scope of this application, it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
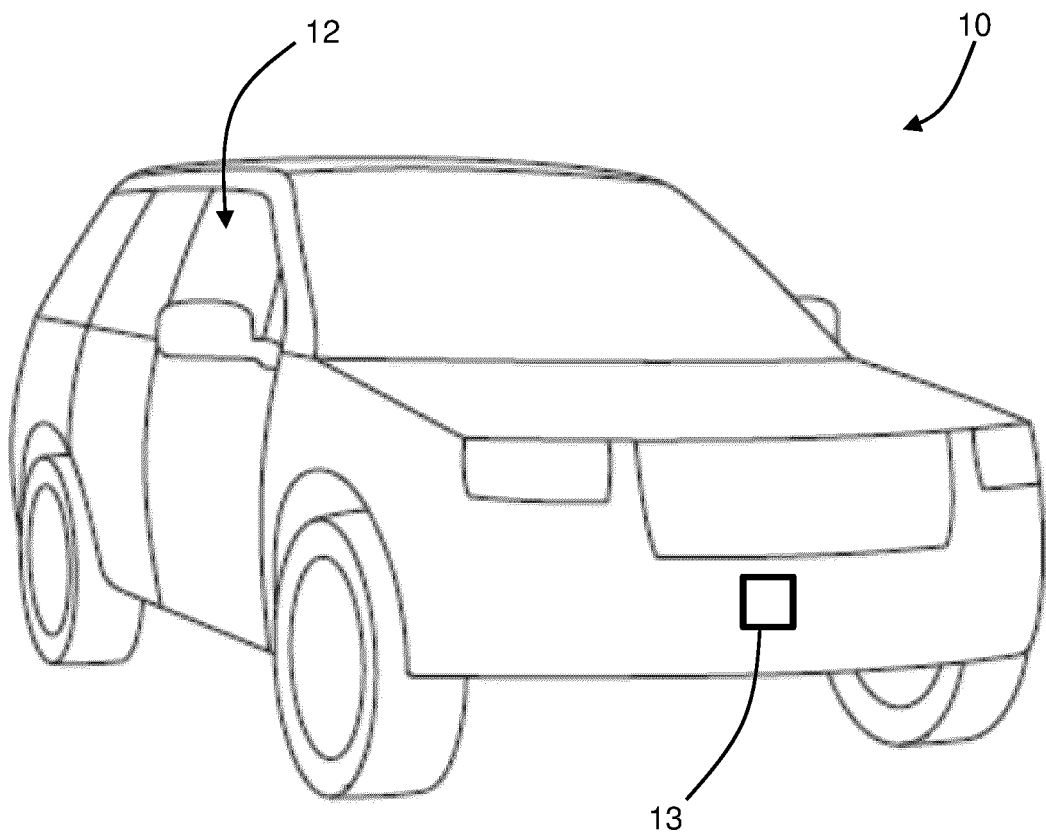
FIG. 1 shows a schematic illustration of a vehicle including a control system according to an example of the invention.

FIG. 1 shows a vehicle 10—in particular, a car—that includes a heating, ventilation and air conditioning (HVAC) system (not shown). The HVAC system is for controlling the flow of air into a cabin 12 of the vehicle 10.

The HVAC system includes a recirculation door and a blower. The recirculation door is for adjusting the ratio of vented to recirculated air entering the vehicle cabin. In a fully closed state of the recirculation door, the HVAC system may be in a recirculation mode in which no air is drawn into the vehicle cabin from outside of the vehicle (i.e. no vented air), with all of the air entering the vehicle cabin being recirculated air. In a fully open state of the recirculation door, all of the air entering the vehicle cabin may be drawn from outside of the vehicle (i.e. all vented air). The recirculation door will typically be adjustable to a number of intermediate positions between the fully open and fully closed states. The blower of the HVAC system can be controlled to adjust an amount (or flow rate) of air entering the vehicle cabin.

The HVAC system can be used to adjust the temperature of air entering the vehicle cabin 12. In particular, the HVAC system includes a heater core for heating air prior to it entering the cabin 12, and an air conditioning evaporator for cooling air prior to it entering the cabin 12, where air can be directed past these components as appropriate to control cabin air temperature as desired.

The HVAC system further includes one or more air filters or purifiers in order to remove one or more pollutants from the vented and/or recirculated air. In particular, the air may be directed past at least some of the air filters to purify the air before entering the cabin 12.

The HVAC system air filters may include a particulate matter (PM) filter for removing particulate matter from air entering the vehicle cabin 12. The PM filter may be of any suitable granularity. In the described example, a PM2.5 filter for filtering fine particulate matter is used, i.e. for filtering particulate matter up to 2.5 microns in diameter. However, it will be understood that other PM filters may additionally or alternatively be used, for example PM1, PM3, PM10, etc.

The HVAC air filters may include a carbon layer filter for removing odour, volatile organic compounds, and/or toxic gases from air entering the vehicle cabin 12. For instance, such a filter may include a bed of activated carbon that uses adsorption to trap pollutants in air passing through the filter so as to remove such impurities from the air.

The HVAC filters may include an anti-allergen layer for removing one or more allergens from air entering the vehicle cabin 12. For instance, such a filter may include a HEPA (High Efficiency Particulate Air) filter that can intercept microscopic and larger particles using a matt of fine fibres as air passes through the filter in order to remove pollutants therefrom.

The HVAC system may include one or more ionizers for removing one or more pathogens from vehicle cabin air. In particular, an ionizer creates a static charge around airborne contaminants—for example OH radicals—in vehicle cabin air in order to remove contaminants from the air. In this way, these contaminants are less likely to be inhaled by occupants of the vehicle cabin 12. The vehicle 10 may be provided with any suitable number of ionizers, which may be located as appropriate in the vehicle 10. In one example, the vehicle 10 may be provided with two ionizers in the cabin 12: one in the vicinity of a front row of seats in the cabin 12; and, one in the vicinity of a rear row of seats in the cabin 12.

The vehicle 10 includes a control system 13 for controlling operation of the HVAC system. A number of known features or modes of operation may be possible, which may be selected by a driver or passenger of the vehicle 10, for example via an HMI (human-machine interface) within the cabin 12 during a vehicle journey, or may be activated automatically during a vehicle journey. For instance, in a recirculation mode air is recirculated around the cabin 12 without any air being drawn into the cabin from outside of the vehicle 10, for example by controlling the recirculation door to be fully closed. Operating in recirculation mode may be beneficial when the vehicle is passing through a tunnel, for example, in order to avoid drawing gases that have been emitted by other vehicles and collected in the tunnel into the vehicle 10. On the other hand, in a fresh air mode no air is recirculated within the cabin 12 and air from outside of the vehicle 10 is introduced into the cabin 12, for example by controlling the recirculation door to be fully open. Operating in fresh air mode may be more beneficial when windows of the vehicle 10 need to be de-fogged, for example, as this can help to reduce a temperature difference between the cabin and outside of the vehicle 10. Note that these known 'in-journey' features are different from the feature of the present invention which, as discussed in more detail below, operates when a vehicle journey is no being undertaken.

The control system 13 can operate the HVAC system to control the cabin air temperature to be a desired temperature, for instance by directing air that is to be introduced into the cabin 12 past the heater core or air conditioning evaporator as appropriate. It may be beneficial to control the HVAC system to operate in a particular mode of operation in order to control the cabin temperature. For instance, if the external temperature is relatively high and lower cabin temperature is desired, then operating in the re-circulation mode can allow the cabin temperature to be lowered more quickly using the air conditioning evaporator as warm external air is not drawn into the cabin 12.

The control system 13 can also control the HVAC system to purify the air in the vehicle cabin 12. Although all air entering the vehicle cabin 12—whether it be vented air or recirculated air—may pass through one or more filters before being introduced into the cabin 12, the HVAC system may be controlled to further clean or filter the cabin air. For instance, the HVAC system may be controlled to enter recirculation mode and to activate the blowers (or increase blower speed) so that the cabin air is recirculated through the filters to increase the amount of contamination that is removed from the air. Increasing the airflow also circulates a greater amount of air past the ionizers in the cabin so that a greater number of floating particles can be removed.

The present invention is advantageous in that a vehicle HVAC system can be controlled to provide a more reliable level of cleaning of the air in the vehicle cabin. The present invention is also advantageous in that occupants of the vehicle cabin may be exposed to cleaner air for a greater part of a vehicle journey, or at least at the start of a vehicle journey, without being reliant on in-journey filtration.

The advantageous effects of the invention are achieved by controlling the control system 13 to operate the vehicle HVAC system to perform a cabin air cleaning cycle while the vehicle 10 is not undertaking a journey, for example prior to a vehicle journey. A certain level of cabin air cleaning may not be able to be guaranteed while the vehicle is in use, i.e. during a vehicle journey, because one or more actions or preferences of the cabin occupants may be in conflict with the cleaning actions taken by the HVAC system. For instance, a vehicle passenger may wish to lower their window during a vehicle journey; however, this may allow pollutants from the atmosphere external to the vehicle 10 into the vehicle 10, thereby reducing the effectiveness of any HVAC system cleaning functions that are operating. As another example, the mere presence of one or more people in the vehicle cabin may in certain cases lead to an increased spread of viruses in the cabin 12.

By performing cabin air cleaning when a vehicle journey is not being undertaken, one or more external factors that could contribute to an increased level of pollution in the cabin 12 can therefore be eliminated or accounted for so as to provide a more reliable level of cabin cleaning. In this regard, when a user requests that the HVAC system performs a cabin air cleaning cycle, one or more conditions may need to be met before the controller controls the HVAC system to perform the cabin air cleaning cycle, so that a certain level of cleaning is more likely to be achieved.

Figure 2:
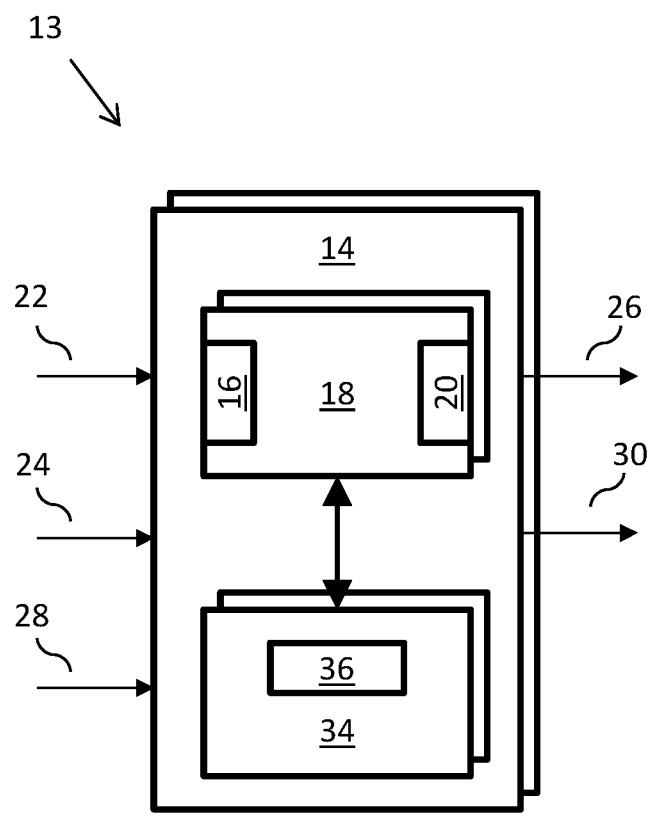
FIG. 2 shows a schematic illustration of the control system of FIG. 1.

FIG. 2 shows the control system 13, together with the inputs to, and outputs from, the control system 13. The control system 13 includes one or more controllers 14. It is to be understood that the or each controller 14 can comprise a control unit or computational device having one or more electronic processors (for example, a microprocessor, a microcontroller, an application specific integrated circuit (ASIC), etc.), and may comprise a single control unit or computational device, or alternatively different functions of the or each controller 14 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 14 to implement the control techniques described herein (including some or all of the functionality required for the method described herein). The set of instructions could be embedded in said one or more electronic processors of the controller 14; or alternatively, the set of instructions could be provided as software to be executed in the controller 14. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 2, the or each controller 14 comprises at least one electronic processor 18 having one or more electrical input(s) 16 for receiving signals related to HVAC system cleaning, and one or more electrical output(s) 20 for outputting one or more output control signal(s) 26, 30. The or each controller 14 further comprises at least one memory device 34 electrically coupled to the at least one electronic processor 18 and having instructions 36 stored therein. The at least one electronic processor 18 is configured to access the at least one memory device 34 and execute the instructions 36 thereon so as to determine whether one or more conditions are satisfied.

The, or each, electronic processor 18 may comprise any suitable electronic processor (for example, a microprocessor, a microcontroller, an ASIC, etc.) that is configured to execute electronic instructions. The, or each, electronic memory device 34 may comprise any suitable memory device and may store a variety of data, information, limit value(s), lookup tables or other data structures, and/or instructions therein or thereon. In an embodiment, the memory device 34 has information and instructions for software, firmware, programs, algorithms, scripts, applications, etc. stored therein or thereon that may govern all or part of the methodology described herein. The processor, or each, electronic processor 18 may access the memory device 34 and execute and/or use that or those instructions and information to carry out or perform some or all of the functionality and methodology describe herein.

The at least one memory device 34 may comprise a computer-readable storage medium (for example a non-transitory or non-transient storage medium) that may comprise any mechanism for storing information in a form readable by a machine or electronic processors/computational devices, including, without limitation: a magnetic storage medium (for example floppy diskette); optical storage medium (for example CD-ROM); magneto optical storage medium; read only memory (ROM); random access memory (RAM); erasable programmable memory (for example EPROM ad EEPROM); flash memory; or electrical or other types of medium for storing such information/instructions.

Example controllers 14 have been described comprising at least one electronic processor 18 configured to execute electronic instructions stored within at least one memory device 34, which when executed causes the electronic processor(s) 18 to carry out the method as hereinbefore described. However, it will be appreciated that embodiments of the present invention can be realised in any suitable form of hardware, software or a combination of hardware and software. For example, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

Cabin air cleaning is requested by a user, for example vehicle owner, and this request 22 is received by the control system 13. Bearing in mind that the cleaning cycle is to be performed when the vehicle is not in use, there are different ways in which the request 22 may be made by the user. In one example, the user sends the cleaning request signal 22 (or cleaning cycle request 22) from off-board the vehicle 10 to the control system 13. In particular, the request 22 may be made remotely via a mobile device, for example cellular phone, of the user, for instance via an appropriate application (app) on the mobile device (for example via a touchscreen of the mobile device). That is, the request may be made via wireless communication between the mobile device and the vehicle 10. Other requests may be made by the user via such a mobile device application, for example a request to control the HVAC system to adjust the cabin temperature to a desired temperature prior to a vehicle journey, or a request to heat one or more of the vehicle seats.

In another example, the user sends the cleaning request signal 22 from on-board the vehicle 10 to the control system 13. For instance, the request 22 may be made via an HMI, for example touch screen, within the vehicle cabin 12.

The cleaning request signal 22 indicates a time at which the user requests the cleaning cycle to be performed. The user can request that the cleaning cycle is initiated immediately, i.e. at the current time or 'on-demand'. Alternatively, the user can request that the cleaning cycle be performed at a particular scheduled time, i.e. a future time.

If the request 22 is made remotely, for example via a mobile device, then the request 22 can be either an on-demand request or a scheduled request. On the other hand, if the request 22 is made by the user from on-board the vehicle 10, then only a scheduled request may be possible. This is because the cleaning cycle is to be performed when the vehicle is not in use in order to provide a more reliable level of cleaning, and so it may not be possible to initiate the cleaning cycle when the user is on-board the vehicle 10.

At the time at which the user has requested cabin cleaning, the processor 18 determines whether cabin cleaning can indeed be initiated. If the cleaning request signal 22 is to immediately perform cabin cleaning, then the processor 18 performs the determination upon receipt of the request. If the cleaning request signal 22 is a scheduled request, then upon receipt of the request 22 the processor 18 waits until the scheduled time requested by the user before performing the determination.

The determination as to whether cabin cleaning can be initiated is based on whether one or more conditions are satisfied. By ensuring that certain conditions are satisfied, there is a greater level of assuredness that a certain level of cabin cleaning can be achieved. The control system 13 therefore receives one or more signals 24 indicative of various conditions or factors associated with the vehicle 10 that are to be used to determine whether to initiate cabin cleaning.

One of the conditions to be satisfied is that the vehicle 10 is not currently undertaking a vehicle journey. This determination may be made based on one or more signals 24 indicative of vehicle operation. For instance, the determination may involve checking that one or more of the following are satisfied: an engine of the vehicle is off; the vehicle is stationary; a current power mode of the vehicle is a power off mode, or at least a power mode in which air is not let into the vehicle from the outside; and, an alarm of the vehicle is active. The vehicle condition signals 24 may therefore include signals from sensors or systems of the vehicle 10 that indicate a current status of any of these factors. If the control system 13 receives more than one signal 24 indicative of whether the vehicle 10 is not currently undertaking a vehicle journey, then it may be that each of the signals 24 need to satisfy the respective condition so that an overall determination of the vehicle 10 not being in use is made. Alternatively, only one, or fewer than each, of the conditions may need to be satisfied to determine the vehicle 10 is not in use.

The cleaning cycle that is initiated at the requested time may be a predefined cleaning cycle performed by the HVAC system, for example performing prescribed operations for a prescribed amount of time as part of a prescribed control routine. For instance, the cleaning cycle may last one hour; however, it will be understood that any suitable length of time may be prescribed Again, by predefining the cleaning cycle in this way a more reliable level of cabin cleaning may be achieved via this functionality.

As the vehicle 10 is not in use when the cleaning cycle is initiated, then a battery of the vehicle 10 may be used to power the HVAC system to perform the cleaning cycle. The vehicle 10 may or may not include an internal combustion engine (ICE). The vehicle 10 may be a plug-in hybrid electric vehicle (PHEV), a battery electric vehicle (BEV), or any other suitable type of vehicle including a battery for powering the HVAC system cleaning cycle. Beneficially, this ensures that an engine of the vehicle 10 does not need to be started to perform the cleaning cycle (i.e. a remote engine start function is not needed), thereby limiting vehicle emissions into the environment caused by this functionality. It may therefore need to be determined that the vehicle battery has sufficient charge to perform the cleaning cycle before the cleaning cycle is initiated. As such, one of the vehicle condition signals 24 may be a signal indicative of a current level of charge of the vehicle 10. The processor 18 may then determine whether the level of charge of the battery exceeds a charge limit level in order to satisfy the condition. In an example, if there is not sufficient battery to perform the cleaning cycle when it is requested that it is initiated, then it may be possible to schedule charging of the battery to be performed and, once this is completed, then to control the HVAC system to initiate the cleaning cycle.

A further condition that may need to be satisfied before initiating the cleaning cycle is that the vehicle is secure in the sense that air from external to the vehicle 10 cannot enter the vehicle cabin 12. Again, this helps to ensure that a certain level of cabin cleaning is achieved by reducing the risk that pollutants from the external environment can enter the cabin 12. The checks to ensure that the vehicle 10 is secure may include one or more of checking that the vehicle windows are closed, the vehicle doors are closed, the vehicle roof panel is closed, the vehicle tail gate is closed, the vehicle bonnet is closed, and/or the vehicle doors are locked. The vehicle conditions signals 24 may therefore include signals from various vehicle sensors to allow such a determination or check to be made.

Further checks to ensure that the vehicle 10 is secure prior to performing cabin cleaning may include a check that the vehicle has not been involved in a crash, that the vehicle has not been stolen, and/or that an emergency or breakdown call system of the vehicle has not been activated automatically or manually. To this end, the vehicle condition signals 24 may include a crash status, a theft status, and/or an emergency or breakdown call status of the vehicle 10 from one or more other sensors or systems of the vehicle 10.

In some examples, it may only be possible for the user to initiate a predefined number of cleaning cycles between successive vehicle journeys. For instance, a maximum of three cleaning cycles may be initiated between successive vehicle journeys if the vehicle 10 is a PHEV or BEV, whereas a maximum of only one cleaning cycle may be initiated between successive vehicle journeys if the vehicle 10 is an ICE vehicle; however, it will be appreciated that any suitable maximum number may be defined. This may help to protect the vehicle battery, for instance. The vehicle conditions signals 24 may therefore include a signal indicative of how many times the HVAC system cleaning cycle has been initiated since the previous vehicle journey. This information may be stored in, and retrieved from, a memory device. For instance, the previous vehicle journey may be indicated by a time at which the previous ignition cycle of the vehicle 10 occurred. The processor 18 then determines whether a condition is satisfied that the number of cleaning cycles that have been initiated since a previous vehicle journey is not greater than the prescribed maximum number (or upper number) of cleaning cycles.

In order that a certain level of cleaning is achieved by performing the cleaning cycle, a condition that one or more components of the HVAC system are not faulty may need to be satisfied. For instance, if the recirculation door is faulty and cannot be actuated to a position that does not allow vented air to enter the vehicle cabin 12, then the cleaning cycle may not be initiated. To this end, the vehicle condition signals 24 may therefore include one or more sensor or system signals indicative of a fault status of various components of the HVAC system.

As mentioned above, a user can also request different remote functions or features to be performed by the vehicle, either as a scheduled request or an immediate request, via a mobile device application from off-board the vehicle or via an HMI on-board the vehicle. These features may include cabin preconditioning (i.e. climate preconditioning) or heating the vehicle seats. A condition for the HVAC system cleaning cycle to be initiated may be that none of the other remote features or functions available to a user are in use at that point. This may be restricted to remote features that are performed by the HVAC system. This may help to ensure that a certain level of cleaning is achieved by performing the cleaning cycle. The vehicle condition signals 24 may therefore include a signal indicative of a status of various other remote features of the vehicle 10. If another of the remote features, for example climate preconditioning, is operational when the cleaning cycle is requested to be initiated, then it may be possible to schedule the cleaning cycle to be performed after the remote feature currently operating has been completed.

If another feature such as climate preconditioning is operational or initiated when the cleaning cycle is operational or requested to be initiated, then the action taken may depend on whether the cleaning cycle request 22 is a scheduled request for future cleaning or an on-demand request for immediate cleaning. For instance, if an on-demand cleaning cycle is ongoing and another scheduled feature, for example climate preconditioning, is triggered or initiated, then the on-demand cleaning cycle may be aborted, and the other scheduled feature initiated instead. If a scheduled cleaning cycle is triggered or initiated and another on-demand feature is ongoing, then the other on-demand feature may be continued. If scheduling of a cleaning cycle is ongoing and another on-demand feature is triggered or initiated, then a message may be transmitted to the user to decide to stop the cleaning cycle. If an on-demand cleaning cycle is triggered or initiated and scheduling of another feature is ongoing, then a message may be transmitted to the user to decide to stop the other feature.

Also, if a second cabin cleaning request is received when a first or previous cabin cleaning request is ongoing, then the action taken may depend on whether the cleaning cycle requests are scheduled or on-demand requests. For instance, if a first on-demand cleaning cycle is ongoing and a second on-demand cleaning cycle is requested, then the first cleaning cycle may be continued. If a first scheduled cleaning cycle is ongoing then a second scheduled cleaning cycle may not be permitted to be triggered. If a first scheduled cleaning cycle is ongoing and a second on-demand cleaning cycle is requested, then the first cleaning cycle may be continued.

If the processor 18 determines that the one or more conditions are satisfied, then the controller output 20 transmits a control signal 26 to control the HVAC system to initiate the air cleaning cycle (or air quality cycle). This may include initially extracting cabin air and drawing in new air from external to the vehicle 10, for example operating in a fresh air mode for an initial period such as a few minutes. This may serve to remove odours from the cabin 12 at the outset. As mentioned above, initiating the cleaning cycle may then include controlling the HVAC system to enter a recirculation mode (for the rest of the cleaning cycle) so that air from external to the vehicle 10 does not enter the cabin 12, which may include switching the blower(s) on to encourage the cabin air to circulate. In this way, the cabin air is filtered or purified by drawing air through or past the various filters included as part of the HVAC system. The ionizers may also be switched on when the cleaning cycle is initiated.

Irrespective of whether the cleaning cycle request 22 is sent from off-board or on-board the vehicle 10, the control system 13 may transmit wireless signals 30 off-board the vehicle 10 to the user—in particular, to a mobile device of the user—with updates regarding the cleaning cycle (for example to be output on a display of the mobile device). For instance, the control system 13 may transmit a message to the user to confirm that the cleaning cycle has been initiated when the conditions are satisfied at the requested time. On the other hand, if one or more of the conditions are determined to not be satisfied at the requested time then the control system 13 may transmit an error message to the user informing them that the cleaning cycle cannot be initiated at the current time, optionally with information as to the condition(s) that is not satisfied. Equally, updates regarding the cleaning cycle may additionally or alternatively be transmitted for output by the on-board HMI of the vehicle 10, for example via a display of the HMI.

The vehicle 10 may further include sensors for detecting various levels of pollutants in the cabin 12, optionally relative to the air external to the vehicle 10. For instance, the vehicle 10 may include a PM2.5 sensor in the vehicle cabin 12 for measuring a level of particulate matter in the cabin air. The vehicle 10 may also include a PM2.5 sensor external to the vehicle 10 for measuring a level of particulate matter in the external environment, so that a difference between inside and outside of the vehicle 10 can be determined.

The control system 13 may receive current values of the various air quality (or filter) sensors via the sensor signals 28 and, when the cleaning cycle is initiated, the control system 13 may notify the user of these current sensor readings via the update signal 30 sent to the user.

Once the cleaning cycle has been initiated, the control system 13 may monitor that the one or more conditions continue to be satisfied throughout the duration of the cycle. If, for instance, one of the conditions changes to no longer being satisfied at one point during the cleaning cycle, then the control system 13 may transmit the control signal 26 to control the HVAC system to stop performing the cleaning cycle. For instance, if the vehicle engine is started—indicating the start of a vehicle journey—during the cleaning cycle, then the control system 13 may automatically interrupt the cleaning cycle. As another example, if the monitored battery level becomes such that the cleaning cycle may not be able to be completed, or if the remaining battery level would be too low after performing the cleaning cycle, then the control system 13 may automatically interrupt the cleaning cycle.

If the cleaning cycle is interrupted, then this may be communicated to the user via transmission of the update signal 30 as an error message to the mobile device, which may notify the user of the reason that the cleaning cycle has been interrupted.

The control system 13 may provide the user with periodic or substantially continuous updates on progress of the cleaning cycle as it is being performed via the update or notification signal 30 to the user mobile device. In particular, updates may be provided as and when the user opens (lands on) a relevant page of the mobile device application, for example the app page relating to the cleaning cycle feature. The updates may include information as to how long the cleaning cycle has left to complete, up-to-date sensor readings indicative of the purifying effects that the cleaning cycle is having, etc.

Although the cleaning cycle may be interrupted automatically by the control system 13, for example if the one of the conditions is no longer satisfied, the user may also be able to stop the cleaning cycle mid-cycle by sending a request 22 from the mobile device to the control system 13. Once a cleaning cycle has been interrupted—either automatically or manually—it may be the case that that particular cycle cannot be restarted to allow completion of the cycle. Again, this may be beneficial in order to provide more predictable levels of cleaning, and/or to protect the vehicle battery.

If the cleaning cycle is completed successfully, this may also be communicated to the user mobile device via the update signals 30. This may include information indicating the effectiveness of the cleaning cycle, for instance sensor readings of various levels of pollutants in the vehicle cabin 12 at completion of the cleaning cycle, optionally compared against pre-cycle levels.

Figure 3:
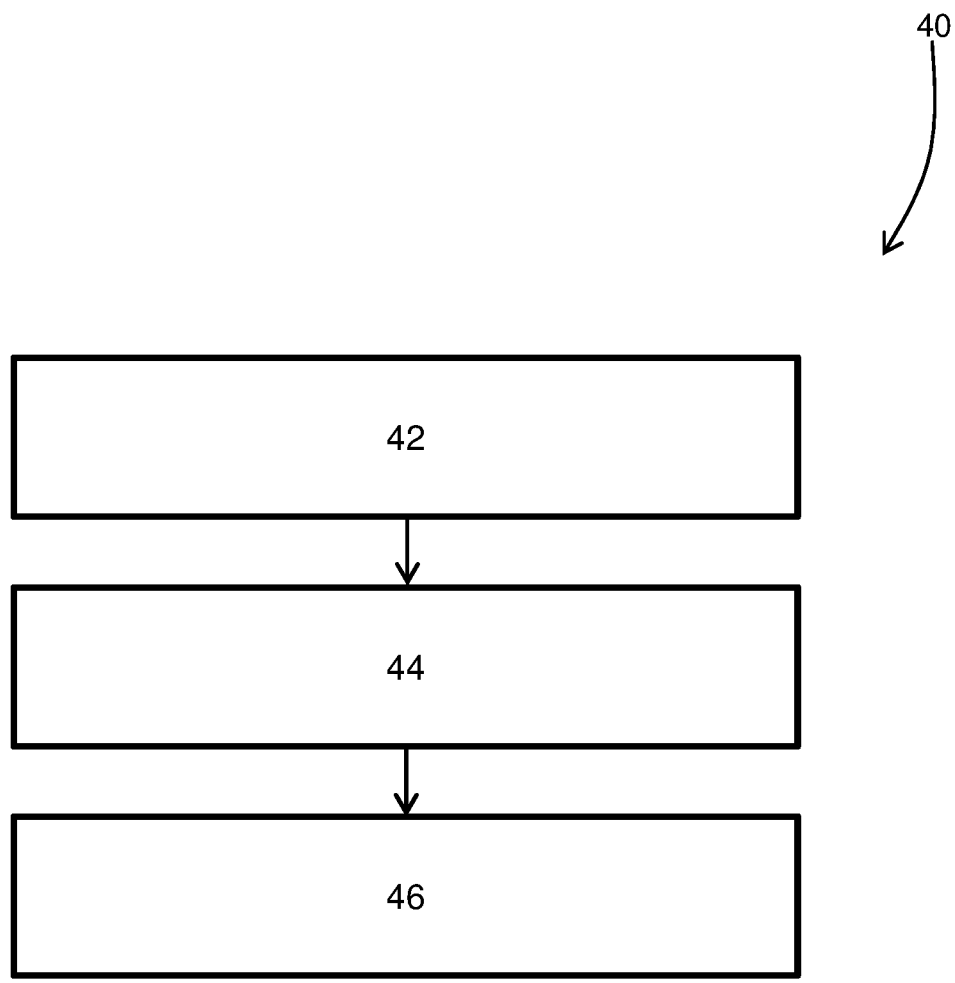
FIG. 3 shows steps of a method performed by the control system of FIG. 1 according to an example of the invention.

FIG. 3 summarises the steps of a method 40 performed by the control system 13. At step 42, the control system 13 receives a cleaning request signal 22 indicating a requested time to initiate a cleaning cycle performed by the HVAC system, where the cleaning cycle is for reducing a level of one or more pollutants in the cabin 12 of the vehicle 10. The request 22 may be from on-board or off-board the vehicle. The request time may be a current time—indicating that the cleaning cycle is requested to commence immediately—or the request time may be a future time—indicating a scheduled time at which the cleaning cycle is requested to commence.

At step 44, the control system 13 determines, at the requested time, whether one or more conditions are satisfied. In particular, the conditions include a condition that the vehicle is not currently undertaking a vehicle journey. This may be determined based on an indication of whether the vehicle is stationary, whether the vehicle engine is off, etc. Other conditions on which the determination is based may include checking that the vehicle 10 is secure such that air from external to the vehicle cannot enter the vehicle cabin 12, checking that the vehicle battery has sufficient charge, etc.

If it is determined that the one or more conditions are satisfied, then at step 46 the control system 13 control system 13 transmits a control signal 26 to control the HVAC system to initiate the cleaning cycle. Once initiated, the control system 13 may transmit update or notifications signals 30 off-board the vehicle 10 to a mobile device of the user, and/or on-board the vehicle 10 to the vehicle HMI. Such notifications 30 may be sent—for example as an error message—if the cleaning cycle cannot be initiated or if the cleaning cycle is interrupted mid-cycle.

It will be appreciated that various changes and modifications can be made to the present invention without departing from the scope of the present application. For example, all of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A control system for controlling a heating, ventilation and air conditioning system of a vehicle, the control system comprising one or more controllers, the control system configured to:
  receive a cleaning cycle request indicating a requested time to initiate a cleaning cycle performed by the HVAC system, the cleaning cycle being for reducing a level of one or more pollutants in a cabin of the vehicle;
  determine, at the requested time, whether one or more conditions are satisfied, the one or more conditions including a condition that the vehicle is not currently undertaking a vehicle journey; and,
  transmit a control signal to control the HVAC system to initiate the cleaning cycle if it is determined that the one or more conditions are satisfied,
  wherein the conditions include a condition that a number of cleaning cycles that have been initiated since previous vehicle journey is not greater than a prescribed upper number of cleaning cycles.

2. A control system according to claim 1, wherein determining whether the condition that the vehicle is not currently undertaking a vehicle journey is satisfied comprises checking that one or more of the following are satisfied:
  an engine of the vehicle is off;
  the vehicle is stationary;
  a current power mode of the vehicle is a power off mode; and,
  an alarm of the vehicle is active.

3. A control system according to claim 1, wherein a battery of the vehicle is configured to power the HVAC system to perform the cleaning cycle, wherein the conditions include a condition that a level of charge of the battery exceeds a charge limit level.

4. A control system according to claim 3, wherein the control system is configured to output a signal indicative of a requirement to schedule charging of the battery in the event that the level of charge of the battery is determined to be less than the charge limit level.

5. A control system according to claim 1, wherein the conditions include one or more of:
  one or more windows of the vehicle are closed;
  one or more doors of the vehicle are closed;
  a roof panel of the vehicle is closed;
  a tail gate of the vehicle is closed;
  a bonnet of the vehicle is closed;
  one or more doors of the vehicle are locked;

a crash status of the vehicle indicates that the vehicle has not been involved in a crash;

a theft status of the vehicle indicates that the vehicle has not been stolen;

an alarm of the vehicle is not active; and, an emergency or breakdown call system of the vehicle is not active.

6. A control system according to claim 1, wherein the previous vehicle journey is indicated by a previous ignition cycle of the vehicle.

7. A control system according to claim 1, wherein the conditions include a condition that one or more components of the HVAC system are not faulty, wherein said one or more components comprises a recirculation door for adjusting the ratio of vented to recirculated air entering the vehicle cabin.

8. A control system according to claim 1, wherein the one or more conditions include a condition that a recirculation door for adjusting the ratio of vented to recirculated air entering the vehicle cabin can be actuated to a position that does not allow vented air to enter the vehicle cabin.

9. A control system according to claim 1, wherein the conditions include a condition that one or more further features of the HVAC system are not currently being performed by the HVAC system, wherein the further features of the HVAC system include a climate conditioning feature for controlling a temperature in the vehicle cabin in accordance with a desired temperature prior to the vehicle undertaking a vehicle journey.

10. A control system according to claim 1, wherein when the cleaning cycle is being performed by the HVAC system, the control system is configured to determine whether one or more stop conditions are satisfied, and the output is configured to transmit a control signal to control the HVAC system to stop the cleaning cycle if it is determined that at least one of the stop conditions is satisfied, wherein the one or more stop conditions include that at least one of the conditions are not satisfied.

11. A control system according to claim 1, wherein to perform the cleaning cycle the HVAC system is configured to draw air in the vehicle cabin through at least one filter component of the vehicle to reduce the level of pollutants in the vehicle cabin, and wherein the one or more filter components including one or more of:

a particulate matter filter for removing particulate matter from the vehicle cabin; wherein the PM filter is a PM2.5 filter;

a carbon layer filter for removing odour, volatile organic compounds, and/or toxic gases from the vehicle cabin;

an anti-allergen layer for removing one or more allergens from the vehicle cabin; and, one or more ionisers for removing one or more pathogens from air in the vehicle cabin.

12. A control system according to claim 1, wherein to perform the cleaning cycle the HVAC system is configured, during an initial period of the cleaning cycle, to operate in a fresh air mode comprising extracting cabin air and drawing in air from external to the vehicle.

13. A control system according to claim 1, wherein to perform the cleaning cycle the HVAC system is configured to enter a re-circulation mode in which the HVAC system does not draw air into the vehicle cabin from external to the vehicle.

14. A control system according to claim 1, wherein the control system is configured to receive the cleaning cycle request as a signal from off-board the vehicle; wherein the signal from off-board the vehicle is from a user device external to the vehicle.

15. A control system according to claim 1, wherein the control system is configured to receive sensor signals, from one or more sensors of the vehicle, indicative of a current level of one or more pollutants in the vehicle cabin, and wherein the control system is configured to transmit a signal, off-board the vehicle to a user device, to notify a user of the current level of the one or more pollutants.

16. A control system according to claim 1, wherein the control system is configured to transmit a signal, off-board the vehicle to a user device, wherein the signal is at least one of:

a signal to inform the user that the cleaning cycle has been initiated;

a signal to inform the user that the cleaning cycle cannot be initiated in the event that it is determined that the one or more conditions are not satisfied;

a signal to inform the user that the cleaning cycle has been interrupted, wherein the signal is to notify the user of the reason that the cleaning cycle has been interrupted; and a signal to inform the user that the cleaning cycle has been completed.

17. A vehicle comprising a control system according to claim 1.

18. A method of controlling a heating, ventilation and air conditioning system of a vehicle, the method comprising:

receiving a cleaning cycle request indicating a requested time to initiate a cleaning cycle performed by the HVAC system, the cleaning cycle being for reducing a level of one or more pollutants in a cabin of the vehicle;

determining, at the requested time, whether one or more conditions are satisfied, the one or more conditions including a condition that the vehicle is not currently undertaking a vehicle journey; and, transmitting a control signal to control the HVAC system to initiate the cleaning cycle if it is determined that the one or more conditions are satisfied, wherein the conditions include a condition that a number of cleaning cycles that have been initiated since a previous vehicle journey is not greater than a prescribed upper number of cleaning cycles; wherein the previous vehicle journey is indicated by a previous ignition cycle of the vehicle.

19. A non-transitory, computer-readable medium storing instructions thereon that, when executed by one or more electronic processors, causes the one or more electronic processors to carry out the method of claim 18.

* * * * *